US008826456B2

(12) United States Patent
Lipscomb

(10) Patent No.: US 8,826,456 B2
(45) Date of Patent: Sep. 2, 2014

(54) BENCHMARK MEASUREMENT FOR LEGITIMATE DUPLICATION VALIDATION

(75) Inventor: Carter Lipscomb, San Francisco, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 2 days.

(21) Appl. No.: 13/212,019

(22) Filed: Aug. 17, 2011

(65) Prior Publication Data
US 2013/0047267 A1 Feb. 21, 2013

(51) Int. Cl.
G06F 7/04 (2006.01)
G06F 21/00 (2013.01)

(52) U.S. Cl.
CPC ..................................... G06F 21/00 (2013.01)
USPC ............................. 726/28; 369/30.09; 726/4

(58) Field of Classification Search
None
See application file for complete search history.

(56) References Cited

U.S. PATENT DOCUMENTS

| 8,271,588 | B1* | 9/2012 | Bruno et al. ................... 709/206 |
| 2006/0259274 | A1* | 11/2006 | Greco et al. ................... 702/182 |
| 2008/0189768 | A1* | 8/2008 | Callahan et al. ................... 726/4 |
| 2009/0154315 | A1* | 6/2009 | Miyashita et al. ........... 369/47.5 |
| 2012/0155233 | A1* | 6/2012 | Spitzlinger et al. ........ 369/30.09 |

* cited by examiner

Primary Examiner — Nirav B Patel
Assistant Examiner — Mohammed Waliullah
(74) Attorney, Agent, or Firm — Nixon Peabody LLP; Khaled Shami

(57) ABSTRACT

A system and method for detecting piracy of a software product that is distributed on a particular media type is described. Embodiments of the invention track a title load time of a software product that is distributed on a particular media type, and compare it against a benchmark load time for that media type. This comparison is used to detect if the title may have been illegally transferred or pirated to another, unauthorized media type.

32 Claims, 7 Drawing Sheets

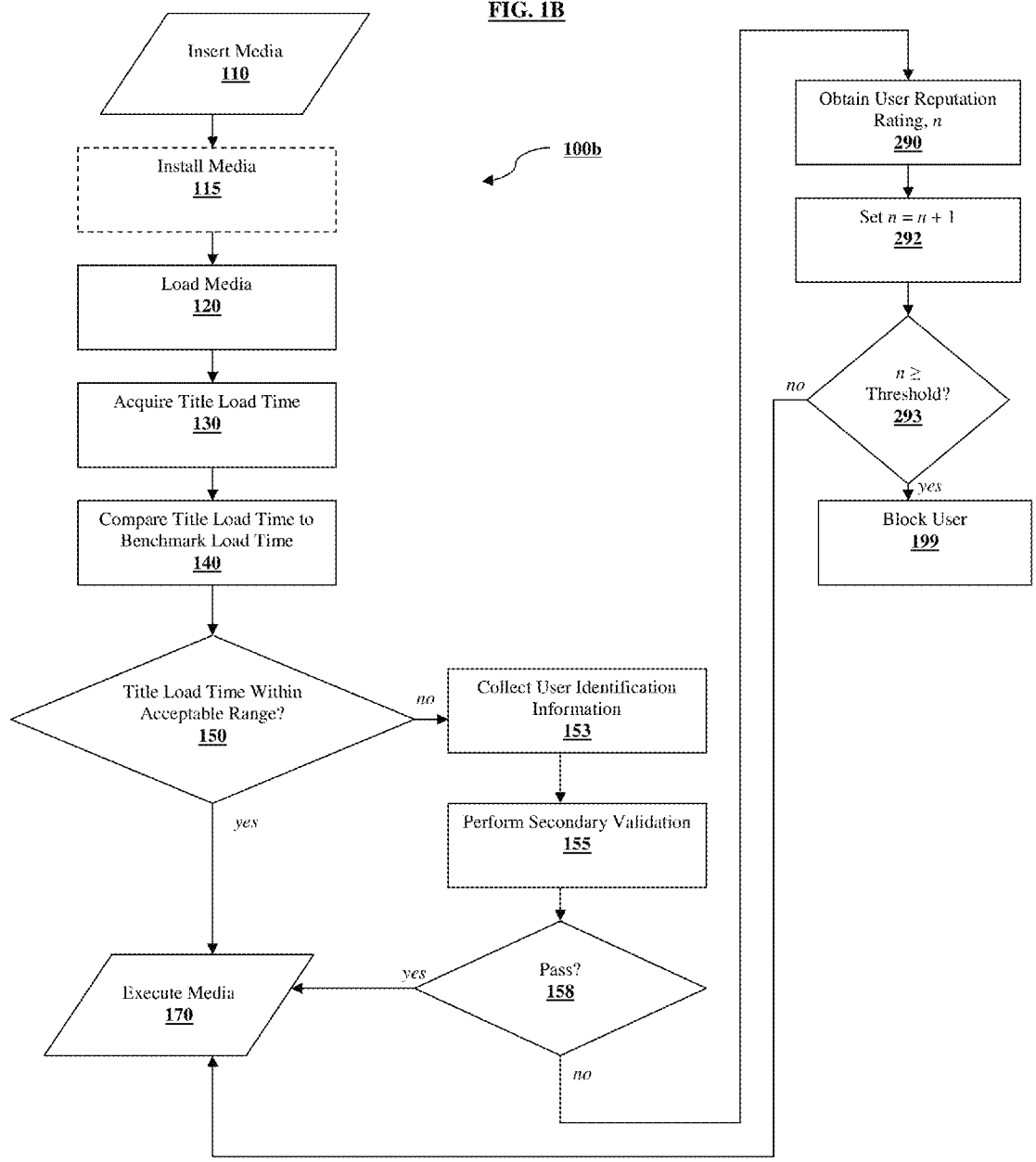

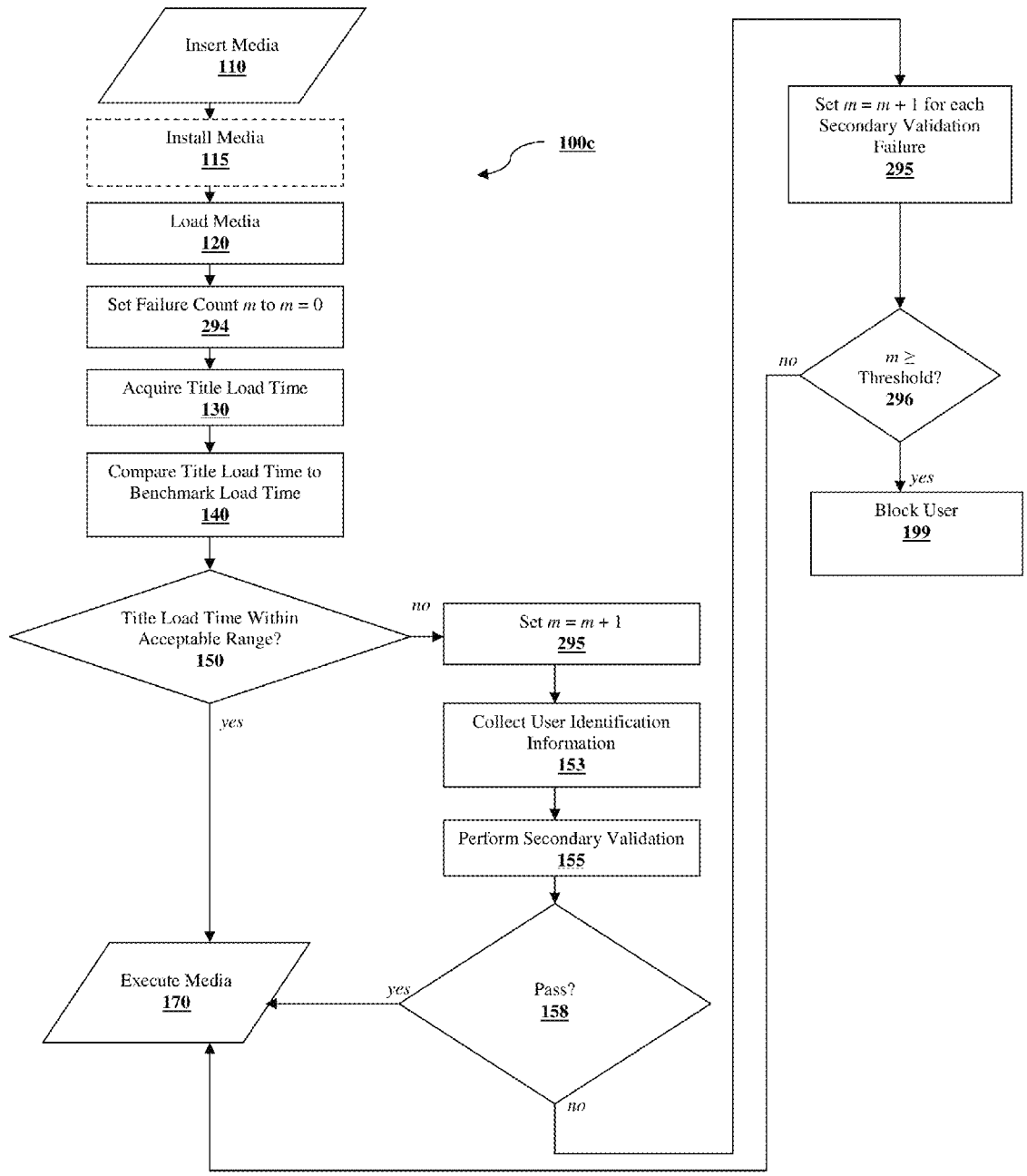

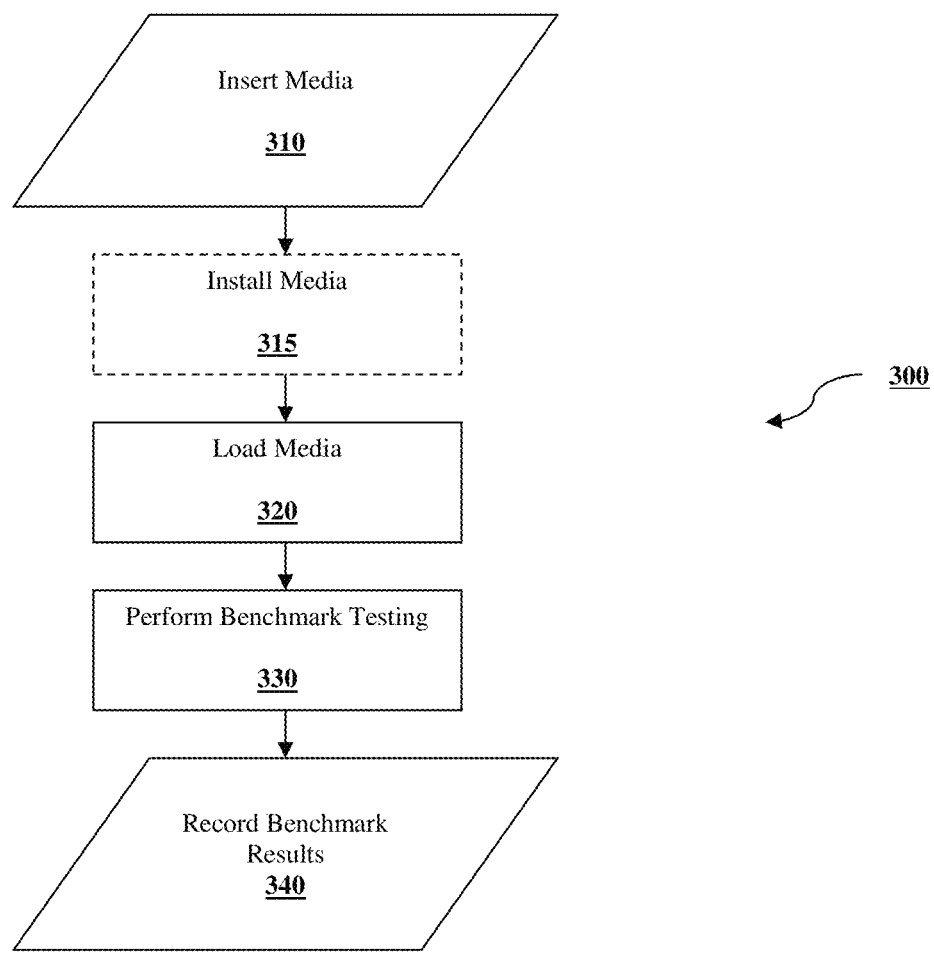

BENCHMARK MEASUREMENT FOR LEGITIMATE DUPLICATION VALIDATION

FIELD

The present disclosure relates generally to piracy detection, and more particularly, to systems and methods for measuring and employing benchmarks for legitimate duplication validation.

BACKGROUND

In recent years, computing devices have developed universal appeal as a primary source of information, entertainment and communication. End-user products integrating these devices, such as televisions, DVD players, game consoles, computers and the like, are created, changed and refined to facilitate consumer access to digital content of all sizes and types. Thus, consumers are often able to acquire large amounts of digital content, such as games, television shows, movies, applications, etc., with a single click of a button. Such digital content is often made available for a premium by device manufacturers and third party developers, who depend on consumer licenses of their content to recoup their research and development costs. These licenses allow the consumer to use and enjoy the content without infringing on the intellectual property rights of the manufacturers or developers.

Unfortunately, as technology rapidly progresses and content becomes more widely available and accessible, consumers have turned to piracy to illegally acquire certain digital content, and in some cases, entire libraries of content. Digital rights management (DRM) software and tamper-resistant hardware are employed by manufacturers to discourage illegal acquisitions. However, pirates are often able to reverse engineer such attempts and circumvent the protection entirely.

SUMMARY

Thus, there is a continuous and ongoing need for novel and improved digital rights management schemes that provide additional layers of protection against piracy. Embodiments of the invention meet this need and others by providing a system and method for measuring and employing benchmarks for legitimate duplication validation.

According to an embodiment of the invention, a method for validating legitimate media products associated with a legitimate media type is described. The method comprises loading a first media product having a first media type on a computing device, measuring a first load time for the first media product on the computing device, establishing a threshold range of acceptable first load times using a second load time for the legitimate media type associated with the legitimate media products, and determining whether the first load time is within the threshold range.

A system for effecting this method is also described herein according to an embodiment of the invention. For example, a system for validating legitimate media products associated with a legitimate media type is described. The system comprises a computing device that loads a first media product having a first media type and that measures a first load time for the first media product, a processor that calculates a second load time for the legitimate media type, establishes a threshold range of acceptable first load times using the second load time, and determines whether the first load time is within the threshold range, and a memory coupled to the processor.

BRIEF DESCRIPTION OF THE DRAWINGS

FIG. 1B is a flowchart illustrating the steps of a method for measuring and employing benchmarks for legitimate duplication validation according to another embodiment of the invention.

FIG. 1C is a flowchart illustrating the steps of a method for measuring and employing benchmarks for legitimate duplication validation according to a further embodiment of the invention.

FIG. 3 is a flowchart 300 illustrating the steps of a method for obtaining and storing benchmark load times according to an embodiment of the invention.

DETAILED DESCRIPTION

A system and method for measuring and employing benchmarks for legitimate duplication validation is described. In the following description, for purposes of explanation, numerous specific details are set forth in order to provide a thorough understanding of the exemplary embodiments. It is apparent to one skilled in the art, however, that embodiments of the present invention can be practiced without these specific details or with an equivalent arrangement. In some instances, well-known structures and devices are shown in block diagram form in order to avoid unnecessarily obscuring the embodiments.

Figure 1A:
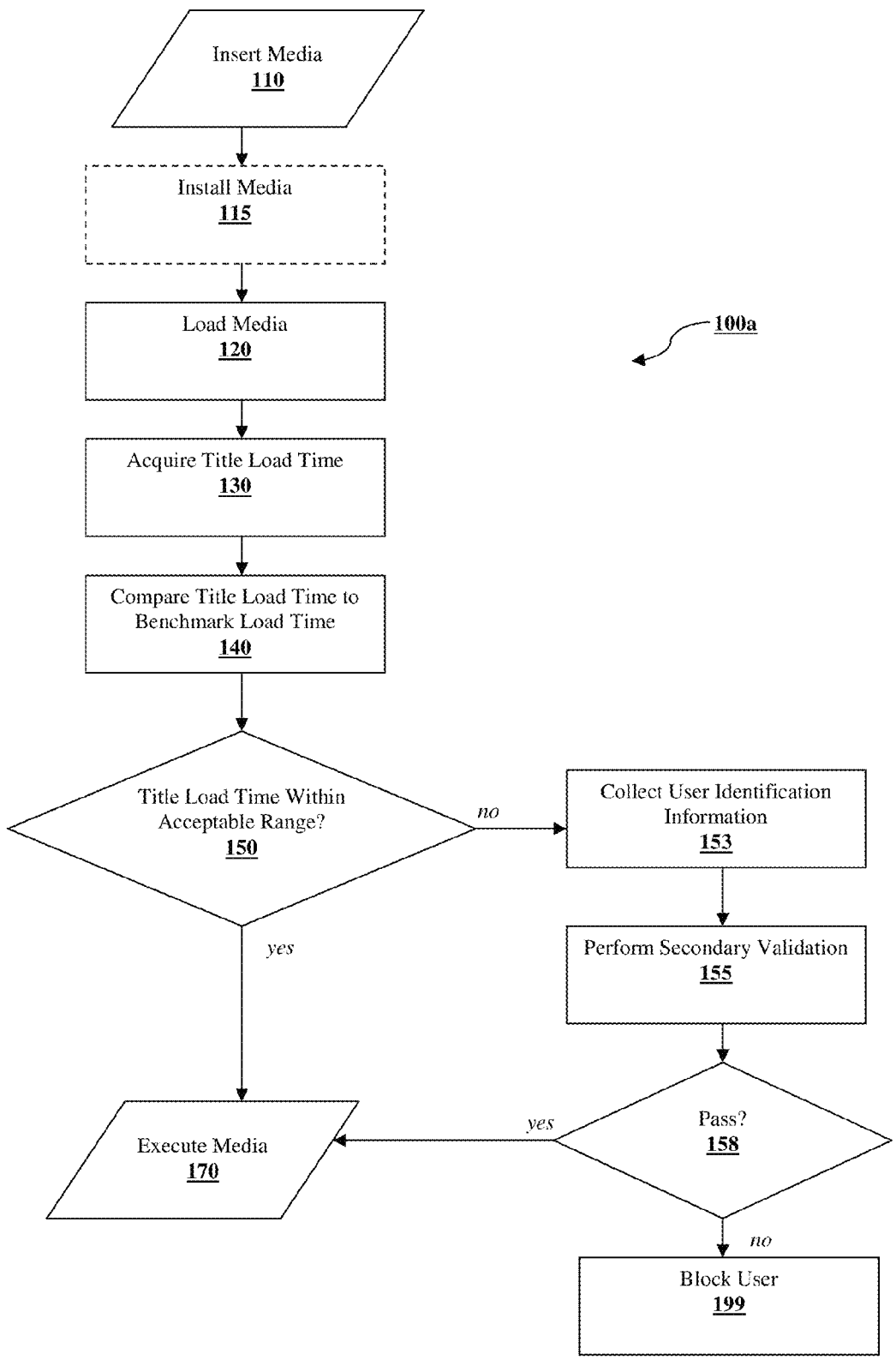
FIG. 1A is a flowchart illustrating the steps of a method for measuring and employing benchmarks for legitimate duplication validation according to an embodiment of the invention.

Referring now to the drawings, wherein like reference numerals designate identical or corresponding parts throughout the several views, FIG. 1A is a flowchart 100a illustrating a method for measuring and employing benchmarks for legitimate duplication validation according to an embodiment of the invention. At I/O block 110, a media product that is distributed on a particular media type is inserted into a computing device. The media product can comprise any type of media or combinations thereof, such as a games, movies, television shows, applications, and the like. The media type can be any type of storage media, executable media, online media and/or streaming media capable of sourcing the media product, such as a CD, a DVD, a BD, a flash drive, a console-specific disc, a memory stick, an internal or external hard drive, an SD card, a remote server, and the like. The computing device can be one or more of any devices capable of executing the particular media type, such as televisions, CD players, DVD players, BD players, set-top boxes, game consoles, computers, and the like. Although described as being "inserted" into a computing device, it is understood that physical insertion of the media product is not necessary in the case of soft media types, and that selection of the media product on the computing device will perform a similar function.

At optional processing block 115, the media is installed, if necessary. While the media is loaded by the computing device at processing block 120, the title load time of the media product is tracked and collected at processing block 130, such as by a benchmarking or similar module. The title load time of the media product is the time required for the computing device to retrieve and process the media product, and is heavily dependent on the media type on which the media product is embodied. For a hard disk drive media type, for example, load time is the sum of the spin-up time, seek time, rotational delay and transfer time. In a non-solid state hard disk drive, spin-up time is the time needed to accelerate the hard disk to operating speed, while seek time is the time required for the actuator arm to reach the desired disk track. With respect to solid state disks (SSDs) that access data without the use of moving parts, there is no spin-up time required, and seek time is instead measured as the delay caused by hardware signal relay and buffering.

Rotational delay, which is heavily dependent on the rotational speed or revolutions per minute (RPM) of a disk, is the delay in bringing the desired disk sector under the read-write component of a rotating storage device, such as a hard disk drive, floppy disk drive, CD drive, DVD drive, BD drive, etc. Transfer time is the time that it takes for the media product to be read from the media type with a certain throughput, i.e., with a particular successful data transmission rate. Each of these types of delays can be separately tracked and collected, or can be collected only in the aggregate. Other performance data, such as processing rates and throughput metrics, can also be collected along with the load time data, either periodically or at particular checkpoints.

Thus, given that various delays affect different media types to different degrees (or do not affect particular media types at all), load times can vary significantly across different media types. In general, total load times from hard disks or flash drives are significantly shorter than those of BD drives, and in some instances can be 15% or less of the total load time of a similar title from a BD drive. For example, a game may have a total load time from a game console BD drive of 45 seconds, while the same game may have a load time from a game console hard disk drive of 4 seconds.

Turning back to FIG. 1A, the title load time is compared to a benchmark load time for that particular media type at processing block 140, either in the aggregate and/or segmented by particular delays or checkpoints. At decision block 150, it is determined whether the title load time is within an acceptable range of load times for that media type. The acceptable range of load times is established based on threshold values of variance from the benchmark load time.

For example, if an authentic game title is distributed exclusively on BDs having a total benchmark load time of 45 seconds on a game console BD drive, the acceptable range of load times could be from 40 to 50 seconds. Thus, a total measured title load time of 4 seconds would be outside of the acceptable range of total load times for a legitimate media type.

In another example, if an authentic game title is distributed exclusively on flash drives having a total benchmark load time of 5 seconds, the acceptable range of load times could be from 4 to 6 seconds. However, an illegitimate game product embodied on a hard disk may also have a total measured title load time of 5 seconds, which would be within the acceptable range of total load times for a legitimate media type. In this instance, each segment of the benchmark load time can be compared to the corresponding segment of the title load time to differentiate between the media types, again using threshold ranges. For example, a benchmark seek time associated with the flash drive could be 150 milliseconds, with an acceptable seek time range of 130 milliseconds to 170 milliseconds. Thus, a measured title seek time of 10 ms associated with the hard disk drive would be outside of the acceptable range of seek times for a legitimate media type.

Similarly, other benchmarking metrics reflecting media type behavior during load time may be used to differentiate masked media types or media types with similar behavior. For example, the sequence of actions performed during a load of an authentic media product can be benchmarked and compared to the sequence of actions performed during the load of a title media product. In another example, a benchmark throughput associated with loading the media product from a flash drive could be 30 megabytes per second, with an acceptable throughput range of 20 megabytes per second to 40 megabytes per second. Thus, a measured title throughput of 100 megabytes per second associated with loading the media on a hard disk drive would be outside of the acceptable range of throughput for a legitimate media type.

The load time can also be segmented and analyzed according to benchmarking metrics at periodic checkpoints throughout the load time. For example, the particular action being taken by a BD drive while loading an authentic BD product can be benchmarked and recorded at regular intervals throughout the load, e.g., every 10 milliseconds. Similarly, the actions being taken by a hard disk attempting to load a media product can be benchmarked and recorded at the same intervals throughout the load, e.g., every 10 milliseconds. The status of the authentic benchmark product at one or more times can then be compared to the status of the title media product to determine validity of the title media product.

For example, if the BD product has a constant throughput throughout a 45 second load time, a measured title throughput of zero for the first 40 seconds and 100 megabytes per second for the last 5 seconds of the load would indicate that the load time of an unauthorized media type has been "padded" to mimic a legitimate media type load time. In other words, by analyzing benchmarking metrics at periodic checkpoints, "padding" at any point or multiple points during a load can be detected to identify unauthorized media products despite apparently identical load times. Similar methods may be used to determine whether the load of a media product has been slowed by a particular factor throughout the load or otherwise tampered with to mimic the load behavior of an authentic media type.

Although described with respect to media type, it is contemplated that load time for the product title could also be taken into account, either independently or in combination with the media type. Load time for the computing device could also be accounted for, such as when the media type can be loaded by more than one type of computing device, or when the media type can be loaded by the same types of computing devices having different configurations.

The benchmark load time can be obtained from any one of a number of sources. For example, benchmark data can be obtained from the manufacturer or developer of the media product title, from previous user title load times associated with a known authentic product, or from reliable third party sources, such as outsourced testers, product reviewers and retail sellers. This information is typically obtained from a server separate from the user device, such that the user is unable to tamper with or otherwise modify the benchmark load time. An exemplary method for obtaining and storing this data is discussed further herein with respect to FIG. 3.

The media is executed at I/O block 170 if the title load time is within the acceptable range. Execution of the media may include, for example, displaying the media. If the title load time is not within the acceptable range, user identification information is collected at processing block 153. This information may include, for example, the user's account name, location, IP address, type of connection, speed of connection, device characteristics and specifications (e.g., device type, device name, device address, device serial number), media type, product name, product license number, and the like.

At processing block 155, secondary validation is performed to make a further determination as to whether the media product is authentic. Secondary validation can use the user identification information collected at processing block 153 in conjunction with previously stored information, augmented by any other available data associated with that user, device, media type or product. For example, one or more of the methods illustrated in FIGS. 2A and 2B can be performed at processing block 155 for secondary validation.

Figure 2A:
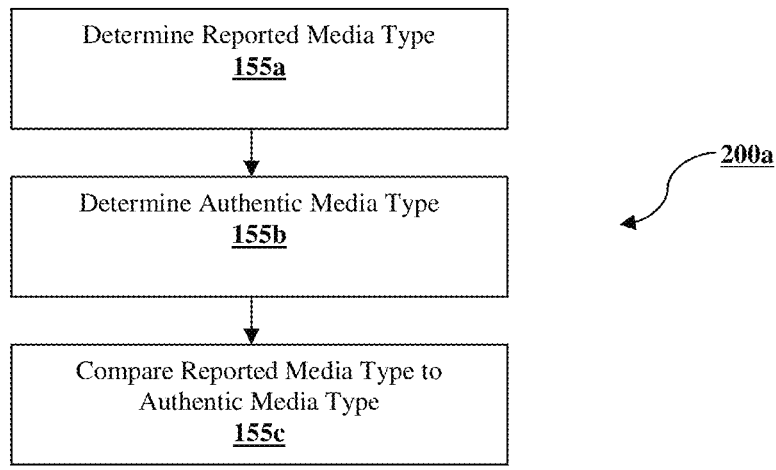
FIG. 2A is a flowchart illustrating the steps of a method for performing secondary validation according to an embodiment of the invention.

FIG. 2A is a flowchart 200a illustrating one method for performing secondary validation according to an embodiment of the invention. At processing block 155a, the reported media type associated with the media product is extracted from the collected user identification information. At processing block 155b, the authentic media type for that media title is determined from available and reliable data, such as that sourced from the manufacturer or developer of the media title. At processing block 155c, the reported media type is compared to the authentic media type. If the reported and authentic media types are the same, then media would pass secondary validation at decision block 158 of FIG. 1A, and would be executed at I/O block 170. If the reported and authentic media types are not the same, then the media would not pass secondary validation at decision block 158 of FIG. 1A, and the user would be blocked from executing the media at end block 199. In another embodiment, if the user identification information does not contain a reported media type (i.e., the computing device fails to report or otherwise withholds its media type), the user would also be blocked from executing the media at end block 199. Alternatively or additionally, in any of these cases, further secondary validation testing can be performed according to any of a variety of methods.

Figure 2B:
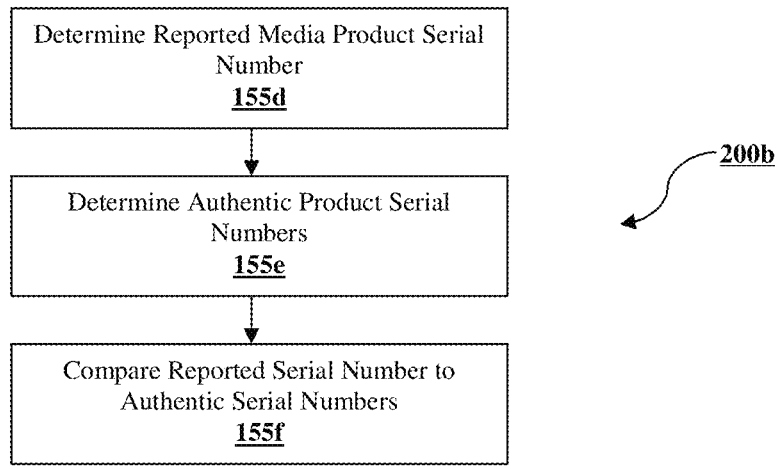
FIG. 2B is a flowchart illustrating the steps of a method for performing secondary validation according to another embodiment of the invention.

FIG. 2B is a flowchart 200b illustrating a method for performing secondary validation according to an embodiment of the invention. At processing block 155d, the reported serial number associated with the media product is extracted from the collected user identification information. At processing block 155e, the authentic product serial numbers for that media title are determined from available and reliable data, such as that sourced from the manufacturer or developer of the media title.

At processing block 155f, the reported serial number is compared to the authentic serial numbers. For example, the reported serial number can be compared to the authentic serial numbers to determine whether the reported number is valid, i.e., whether it has the proper format, is the correct number of digits, is associated with the proper lot, is associated with the proper title, etc. In another example, the comparison can be made to determine whether the reported serial number is active, i.e., to confirm that the reported serial number has been assigned to an available product, and is not associated with a product that has not yet been manufactured or delivered, has been destroyed, or that is not for sale.

In a further example, even if the reported serial number is valid and active, it can be compared to the authentic serial numbers to determine whether it is a duplicated serial number, e.g., a single serial number that has been registered in conjunction with multiple products, or that has been contained in the collected user identification information of multiple unique users. Still further, a valid and active reported serial number can be analyzed with other user identification information to confirm that the product associated with the reported serial number is located within the distribution zone of the product associated with the authentic serial number. With respect to the latter, for example, if a reported serial number is received from China, it could be flagged if the authentic serial number was distributed to Switzerland.

If the reported serial number and other user identification information is not consistent with the authentic serial number and associated information, then the media would not pass secondary validation at decision block 158 of FIG. 1A, and the user would be blocked from executing the media at end block 199. If the reported serial number and other user identification information is consistent with the authentic serial number and associated information, then the media would pass secondary validation at decision block 158 of FIG. 1A, and would be executed at I/O block 170. Alternatively or additionally, in either of these cases, further secondary validation testing can be performed according to any of a variety of methods.

Although described and shown as the user being blocked at end block 199, any number of additional or alternative actions may be taken against an unauthorized user if the title load time is not within an acceptable range and the product does not pass secondary validation. For example, the media product can be erased from the device, if the media type is editable. In another example, the device hardware can be "bricked", or shut off and reconfigured to no longer function.

FIG. 1B is a flowchart 100b illustrating a method for measuring and employing benchmarks for legitimate duplication validation according to a further embodiment of the invention. In this embodiment, the steps corresponding to blocks 110-170 are performed as described above with respect to FIG. 1A. However, in this embodiment, if the title load time is not within an acceptable range and the product does not pass secondary validation, a user reputation rating, n, associated with one or more unique items in the user identification information, is obtained from a host server at processing block 290. If no user reputation rating n is associated with at least one unique item in the user identification information, n is set as 0.

At processing block 292, user reputation rating n is set as n=n+1, indicating that the user has taken an unauthorized action, and increasing the user reputation rating. At decision block 293, it is determined whether n meets or exceeds an established threshold of tolerance for unauthorized actions. If so, the user is blocked at processing block 199, such as is described above with respect to FIG. 1A. If not, the media is executed at I/O block 170, but the increased user reputation rating is maintained, and can be further increased for future unauthorized actions until it meets or exceeds the established threshold of tolerance. This threshold can be determined, set and changed according to a number of variables, can differ between one or more users, and can be reset, decreased or increased over time. Thus, the threshold value can allow for occasional incorrect determinations of unauthorized actions based on errors in title and benchmark load times, comparison errors, secondary validation errors, slow or faulty devices due to manufacturing defects, slow or faulty products due to manufacturing defects, etc. Further, it is contemplated that particularly egregious actions can increase the user reputation rating n by more than one point, and that less severe, less frequent or less documented unauthorized actions can increase the user reputation rating n by less than one point.

In other words, according to this embodiment, a user may be allowed to execute and use the unauthorized product, unless or until additional unauthorized products are loaded and/or other illegal behavior is detected. A user can be "flagged" for each unauthorized action, and further preventative or punitive action taken only when a threshold number of "flags" is associated with that user.

FIG. 1C is a flowchart 100c illustrating a method for measuring and employing benchmarks for legitimate duplication validation according to another embodiment of the invention. In this embodiment, the steps corresponding to blocks 110-170 are performed as described above with respect to FIG. 1A. However, in this embodiment, a failure count is established and modified throughout the method. For example, a failure count m is set to m=0 at processing block 294, which occurs at some point prior to a determination being made of whether the title load time is within an acceptable range at decision block 150. If the title load time is within an acceptable range at decision block 150, the media is executed at I/O block 170.

If the title load time is not within an acceptable range at decision block 150, failure count m is set as m=m+1, representing that a validation test failure has occurred. At processing block 153, user identification information is collected as described above with respect to FIG. 1A, and secondary validation is performed at processing block 155. At decision block 158, it is determined whether the product has passed each secondary validation test. If each secondary validation test is passed, the media is executed at I/O block 170.

However, if one or more secondary validation tests are not passed, failure count m is set as m=m+1 for each instance of secondary validation failure at processing block 295. For example, if the reported media type is an authentic media type, but the product serial number is invalid, failure count m is m=2, assuming no other secondary validation tests are performed and failed. The failure count m=2 represents a total of 2 validation failures; in this case, the title load time is not within an acceptable range and the product serial number is invalid. In another example, if the reported media type is not an authentic media type and the product serial number is invalid, failure count m is m=2, assuming no other secondary validation tests are performed and failed. The failure count m=3 represents a total of 3 validation failures; in this case, the title load time is not within an acceptable range, the reported media type is not an authentic media type, and the product serial number is invalid.

At decision block 296, it is determined whether failure count m meets or exceeds an established threshold of tolerance for validation test failure. If so, the user is blocked at processing block 199, such as is described above with respect to FIG. 1A. Alternatively, when used in conjunction with a user reputation rating system such as is described with respect to FIG. 1B, the user reputation rating can be set as n=n+1, and the user can execute and use the unauthorized product, unless or until additional unauthorized products are loaded and/or other illegal behavior is detected.

If failure count m is less than an established threshold of tolerance for validation test failure, the media is executed at I/O block 170. This threshold for validation test failure can be determined, set and changed according to a number of variables, can differ between one or more users, and can be reset, decreased or increased over time. Thus, the threshold value can allow for occasional incorrect validation test failures based on errors in title and benchmark load times, comparison errors, secondary validation errors, slow or faulty devices due to manufacturing defects, slow or faulty products due to manufacturing defects, etc. Further, it is contemplated that the failure of particularly important validation tests can increase the failure count m by more than one point, and that failure of less important or less relevant validation tests can increase the failure count m by less than one point.

In other words, according to the embodiment of FIG. 1C, a certain number of validation tests must be failed before a user is prevented from using the unauthorized product. Each validation test failure is "flagged", and further preventative or punitive action is taken only when a threshold number of "flags" are reached.

FIG. 3 is a flowchart 300 illustrating a method for obtaining and storing benchmark load times according to an embodiment of the invention. At I/O block 310, the media product is inserted into a computing device. At optional processing block 315, the media is installed, if necessary. The media is loaded by the computing device at processing block 320, and at processing block 330, benchmark testing is performed to measure load time of the media.

Benchmark testing and load time measurement can be automated by any of a number of benchmarking software products. This measurement can be made once and recorded based on the single measurement, or can be performed multiple times. With respect to the latter, the multiple measurements can be averaged to ensure consistency and to reflect a typical load time across various products within a particular product title, for example, or various load devices where the media type can be loaded by different types of load device.

At processing block 340, the benchmark results are recorded in a computer storage medium and saved to the appropriate product title record and media type. Other information, such as the product serial numbers tested, the device serial numbers on which the products were tested, and the benchmarking software used can also be recorded and associated with the benchmark results. These results can be used for the life of the product title, can be updated periodically at particular time intervals, can be updated in conjunction with progressions in technology, etc. For example, benchmarking may be performed again if the computing device loading the media product becomes faster or more efficient, if the configuration of the computing device changes, or if the manufacturer of the computing device or any of its components changes.

Figure 4:
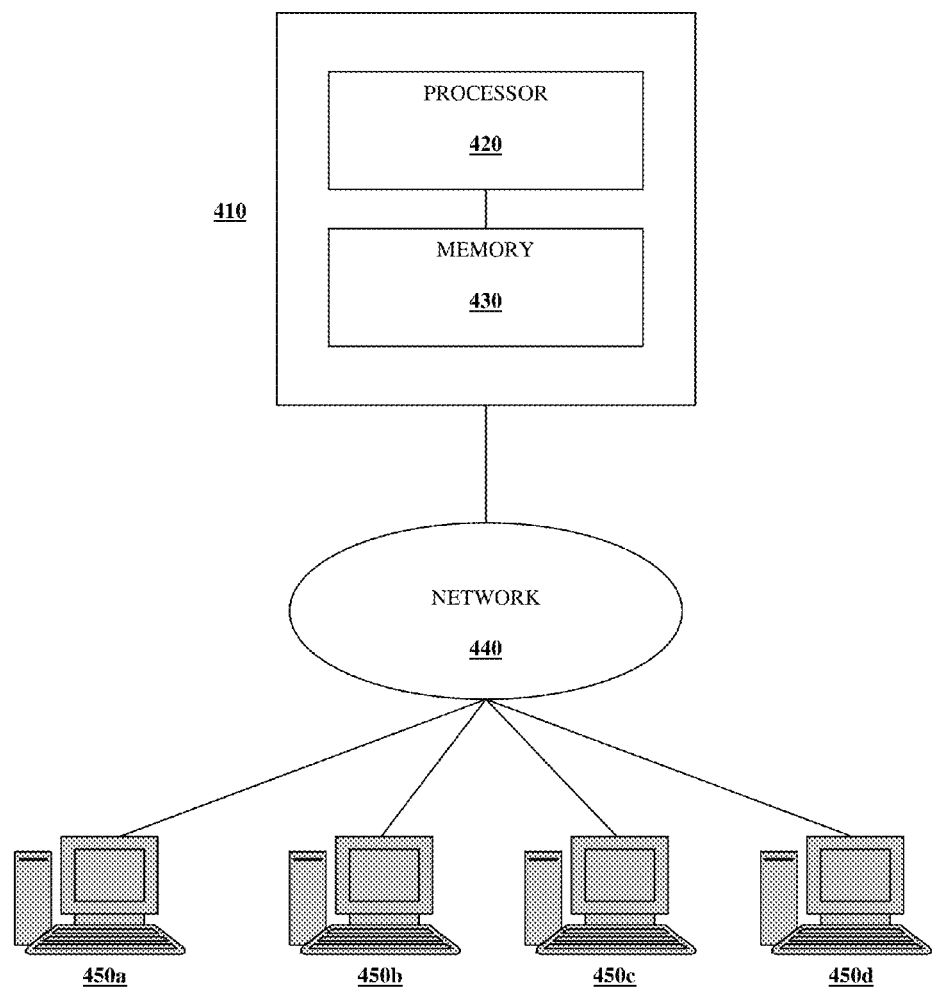
FIG. 4 is a schematic diagram illustrating a system of an embodiment for effecting the methods described herein.

FIG. 4 illustrates server 410 that is connected over network 440 to a plurality of user devices 450. Server 410 includes processor 420 and memory 430, which are in communication with one another. Server 410 is configured to retrieve the title load time and user identification information from users at the plurality of user devices 450a-d. Server 410 is typically a computer system, and may be an HTTP (Hypertext Transfer Protocol) server, such as an Apache server. Memory 430 may be any type of storage media that may be volatile or non-volatile memory that includes, for example, read-only memory (ROM), random access memory (RAM), magnetic disk storage media, optical storage media, flash memory devices, and zip drives. Network 440 may be a local area network (LAN), wide area network (WAN), a telephone network, such as the Public Switched Telephone Network (PSTN), an intranet, the Internet, or combinations thereof. The plurality of user devices 450a-d may be mainframes, minicomputers, personal computers, laptops, personal digital assistants (PDAs), cell phones, televisions, CD players, DVD players, BD players, game consoles, and the like. The plurality of user devices 450a-d are characterized in that they are capable of being connected to network 440.

In implementing the method illustrated in FIG. 1A, for example, a user of one of the plurality of user devices 450a-d (e.g., user device 450a) inserts a media product into user device 450a, loads the media and measures the title load time. User device 450a communicates a request to access and execute the media to server 410 over network 440. For example, a signal is transmitted from user device 450a, the signal having a destination address (e.g., an address representing a server), a request (e.g., a request for access), and a return address (e.g., an address representing user device 450a, which initiated the request).

Processor 420 accesses memory 430 to retrieve a benchmark load time for legitimate media types associated with the loaded media, and compares it to the title load time from user device 450a. If the title load time is within an acceptable range of the benchmark load time, processor 420 grants media access to user device 450a, which is communicated to the user over network 440. For example, another signal may be transmitted that includes a destination address corresponding to the return address of the client system, and a key unlocking further access to the media.

If the title load time is not within an acceptable range of the benchmark load time, server 410 transmits a request to user device 450a over network 440 for user identification information. User device 450a collects the requested identification information, and returns information responsive to the request to server 410, where it is stored in memory 430 in conjunction with a log of the load time validation failure. Processor 420 performs one or more secondary validation tests by comparing the user identification information to known information associated with legitimate products.

If the product passes the secondary validation tests, processor 420 grants media access to user device 450a by communicating a media-unlocking key over network 440. If the product does not pass the secondary validation tests, processor 420 withholds or prevents access to the media by user device 450a. For example, server 410 may simply fail to respond to user device 450a's request to access and execute the media. In another example, server 410 may respond to the request with a deactivation key that erases or uninstalls the media, or that "bricks" user device 450a.

With respect to the embodiment shown in FIG. 1B, processor 420 may alternatively or additionally develop a user profile stored in memory 430 that tracks a user's unauthorized requests and maintains a user reputation rating n associated with a particular user or user device 450a. Server 410 may then respond to the user's request with a key granting access to the media unless and until the user reputation rating n meets or exceeds a particular threshold value. Once user reputation rating n meets or exceeds the threshold value, server 410 responds to future unauthorized requests from user device 450a with a deactivation key that erases or uninstalls the media, or that "bricks" user device 450a.

With respect to the embodiment shown in FIG. 1C, processor 420 may alternatively or additionally track the number of validation test failures m associated with a particular user request in memory 430. Server 410 may then respond to the user's request with a key granting access to the media only if the failure count m is below a threshold failure tolerance level. If the failure count m meets or exceeds the threshold value, server 410 responds to the user's request with a deactivation key that erases or uninstalls the media, or that "bricks" user device 450a. This embodiment can be used in conjunction with that shown in FIG. 1B, such that both the user's overall reputation and the validity of a particular media product are taken into account by processor 420 when determining how to respond to the user request.

Although described with respect to the methods illustrated in FIGS. 1A-1C, it is understood that any of the methods described herein can be similarly performed. Further, although described with particular devices, it is understood that a variety of similar devices may be employed to perform the processes described herein. The functions of these and other embodiments can be described as modules of computer executable instructions recorded on tangible media. The modules can be segregated in various manners over various devices.

Figure 5:
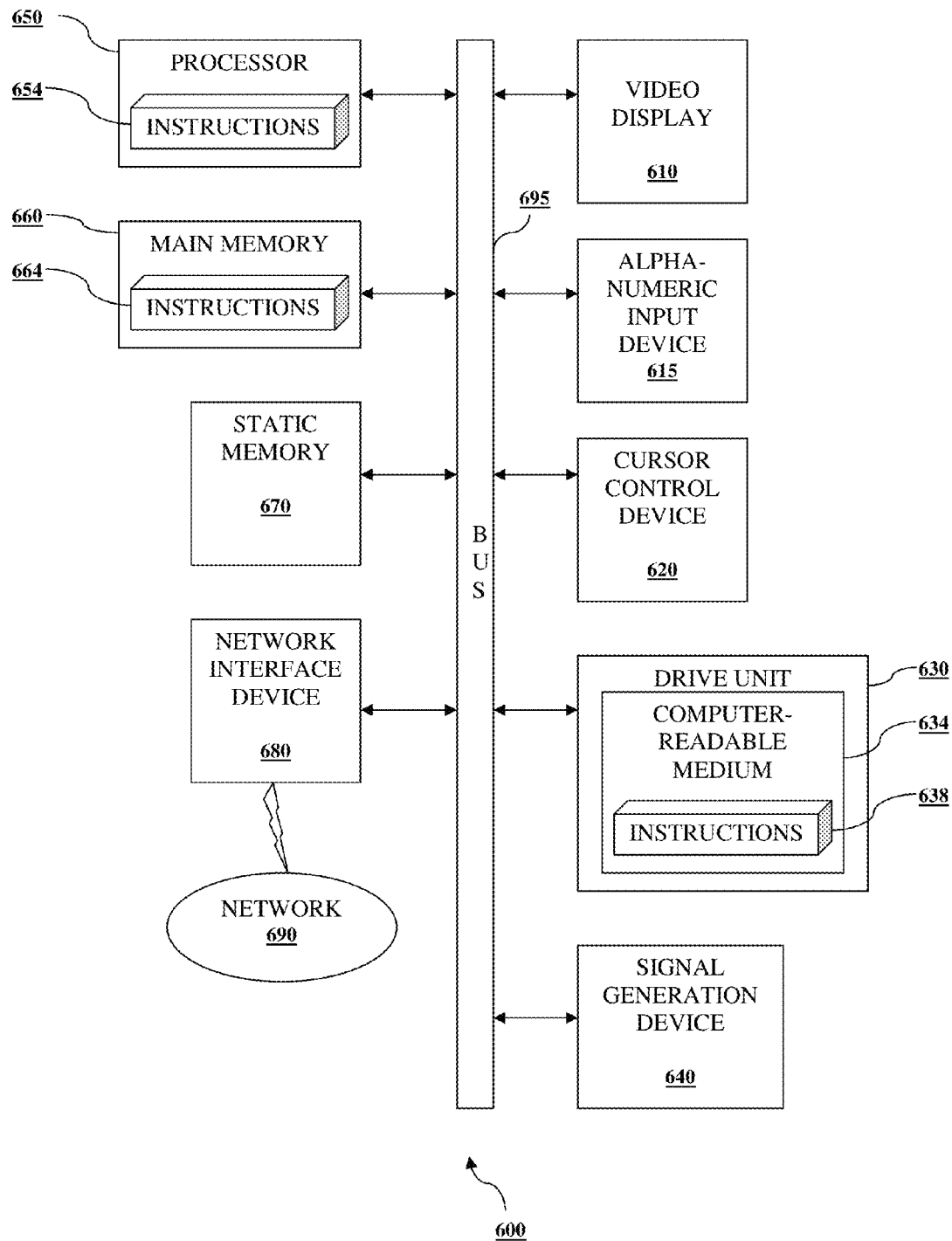
FIG. 5 is diagrammatic representation of a machine having a set of instructions for causing the machine to perform any of the one or more methods described herein.

FIG. 5 shows a diagrammatic representation of machine in the exemplary form of computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, a game console, a television, a CD player, a DVD player, a BD player, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

According to some embodiments, computer system 600 comprises processor 650 (e.g., a central processing unit (CPU), a graphics processing unit (GPU) or both), main memory 660 (e.g., read only memory (ROM), flash memory, dynamic random access memory (DRAM) such as synchronous DRAM (SDRAM) or Rambus DRAM (RDRAM), etc.) and/or static memory 670 (e.g., flash memory, static random access memory (SRAM), etc.), which communicate with each other via bus 695.

According to some embodiments, computer system 600 may further comprise video display unit 610 (e.g., a liquid crystal display (LCD) or a cathode ray tube (CRT)). According to some embodiments, computer system 600 also may comprise alphanumeric input device 615 (e.g., a keyboard), cursor control device 1320 (e.g., a mouse), disk drive unit 630, signal generation device 640 (e.g., a speaker), and/or network interface device 680.

Disk drive unit 630 includes computer-readable medium 634 on which is stored one or more sets of instructions (e.g., software 638) embodying any one or more of the methodologies or functions described herein. Software 638 may also reside, completely or at least partially, within main memory 660 and/or within processor 650 during execution thereof by computer system 600, main memory 660 and processor 650 also constituting computer-readable media. Software 638 may further be transmitted or received over network 690 via network interface device 680.

While computer-readable medium 634 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the disclosed embodiments. The term "computer-readable medium" shall accordingly be taken to include, but not be limited to, solid-state memories, and optical and magnetic media.

It should be understood that processes and techniques described herein are not inherently related to any particular apparatus and may be implemented by any suitable combination of components. Further, various types of general purpose devices may be used in accordance with the teachings described herein. It may also prove advantageous to construct a specialized apparatus to perform the methods described herein. Those skilled in the art will appreciate that many different combinations of hardware, software, and firmware will be suitable for practicing the disclosed embodiments.

Embodiments of the present invention have been described in relation to particular examples, which are intended in all respects to be illustrative rather than restrictive. Further, while embodiments have been described in connection with a number of examples and implementations, it is understood that various modifications and equivalent arrangements can be made to the examples while remaining within the scope of the inventive embodiments.

Other embodiments of the invention will be apparent to those skilled in the art from consideration of the specification and practice of the embodiments disclosed herein. Various aspects and/or components of the described embodiments may be used singly or in any combination. It is intended that the specification and examples be considered as exemplary only, with a true scope and spirit of the disclosure being indicated by the following claims.

What is claimed is:

1. A method for validating legitimate media products associated with a legitimate media type, the method comprising:
    loading a first media product having a first media type on a computing device;
    measuring load times at periodic checkpoints for the first media product on the computing device;
    establishing a threshold range of acceptable load times at the periodic checkpoints using load times at the periodic checkpoints associated with the legitimate media type; and
    determining whether the measured load times are within the threshold range,
    wherein at least one of the checkpoints is total load time of the first media product.

2. The method of claim 1, further comprising:
    executing the first media product on the computing device if the measured load times are within the threshold range; and
    deactivating the first media product on the computing device if the measured load times are outside of the threshold range.

3. The method of claim 1, wherein the periodic checkpoints span total load.

4. The method of claim 1, wherein the measured load times correspond to a plurality of first segments, and the load times at the periodic checkpoints associated with the legitimate media type correspond to a plurality of second segments.

5. The method of claim 4, further comprising:
    comparing one or more of the first segments to one or more corresponding second segments.

6. The method of claim 5, further comprising:
    comparing one or more first load actions associated with the first segments to one or more second load actions associated with the corresponding second segments.

7. The method of claim 6, further comprising:
    identifying a first sequence of the first load actions;
    identifying a second sequence of the second load actions; and
    comparing the first sequence to the second sequence.

8. The method of claim 1, further comprising:
    collecting user identification information; and
    comparing the user identification information with legitimate media product information associated with one or more of the legitimate media products.

9. The method of claim 8, further comprising:
    executing the first media product on the computing device if the user identification information is consistent with the legitimate media product information; and
    deactivating the first media product on the computing device if the user identification information is inconsistent with the legitimate media product information.

10. The method of claim 8, wherein the user identification information comprises a reported media type of the first media product, and wherein the legitimate media product information comprises an identification of the legitimate media type.

11. The method of claim 8, wherein the user identification information comprises a first serial number of the first media product, and wherein the legitimate media product information comprises an identification of one or more legitimate serial numbers.

12. The method of claim 8, further comprising:
    establishing a user reputation rating corresponding to a number of invalid requests associated with the user identification information; and
    establishing an acceptable threshold user reputation rating.

13. The method of claim 12, further comprising:
    executing the first media product on the computing device if the user reputation rating is below the acceptable threshold user reputation rating; and
    deactivating the first media product on the computing device if the user reputation rating is at or above the acceptable threshold user reputation rating.

14. The method of claim 1, further comprising:
    establishing a failure count corresponding to a number of failed validation tests associated with the first media product; and
    establishing an acceptable threshold failure count.

15. The method of claim 14, further comprising:
    executing the first media product on the computing device if the failure count is below the acceptable threshold failure count; and
    deactivating the first media product on the computing device if the failure count is at or above the acceptable threshold failure count.

16. A system for validating legitimate media products associated with a legitimate media type, the system comprising:
    a computing device that loads a first media product having a first media type and that measures a load time for the first media product at periodic checkpoints;
    a processor that calculates load times at the periodic checkpoints for the legitimate media type, establishes a threshold range of acceptable load times at the periodic checkpoints, and determines whether the measured load times are within the threshold range; and
    a memory coupled to the processor,
    wherein at least one of the checkpoints is total load time of the first media product.

17. The system of claim 16, wherein the processor further:
    executes the first media product if the measured load times are within the threshold range; and
    pushes a deactivation key on the computing device if the measured load times are outside of the threshold range.

18. The system of claim 16, wherein the processor further:
    requests user identification information from the computing device if the measured load times are outside of the threshold range; and compares the user identification information with legitimate media product information associated with one or more of the legitimate media products.

19. The system of claim 18, wherein the processor further:
executes the first media product if the user identification information is consistent with the legitimate media product information.

20. The system of claim 19, wherein the processor pushes a deactivation key on the computing device if the user identification information is inconsistent with the legitimate media product information.

21. The system of claim 17, wherein the user identification information comprises a reported media type of the first media product, and wherein the legitimate media product information comprises an identification of the legitimate media type.

22. The system of claim 18, wherein the user identification information comprises a first serial number of the first media product, and wherein the legitimate media product information comprises an identification of one or more legitimate serial numbers.

23. The system of claim 18, wherein the processor further:
establishes a user reputation rating corresponding to a number of invalid requests associated with the user identification information; and
establishes an acceptable threshold user reputation rating.

24. The system of claim 23, wherein the processor further:
executes the media product if the user reputation rating is below the acceptable threshold user reputation rating; and
pushes a deactivation key on the computing device if the user reputation rating is at or above the acceptable threshold user reputation rating.

25. The system of claim 16, wherein the processor further:
establishes a failure count corresponding to a number of failed validation tests associated with the first media product; and
establishes an acceptable threshold failure count.

26. The system of claim 25, wherein the processor further:
executes the media product if the failure count is below the acceptable threshold failure count; and
pushes a deactivation key on the computing device if the failure count is at or above the acceptable threshold failure count.

27. The system of claim 16, wherein the periodic checkpoints span total load time.

28. The system of claim 16, wherein the measured load times correspond to a plurality of first segments, and the load times at the periodic checkpoints associated with the legitimate media type correspond to a plurality of second segments.

29. The system of claim 28, wherein the processor further compares one or more of the first segments to one or more corresponding second segments.

30. The system of claim 29, wherein the processor further compares one or more first load actions associated with the first segments to one or more second load actions associated with the corresponding second segments.

31. The system of claim 30, wherein the processor further:
identifies a first sequence of the first load actions;
identifies a second sequence of the second load actions; and
compares the first sequence to the second sequence.

32. The system of claim 17, further comprising:
a display coupled to the computing device that displays the executed first media product.

* * * * *